United States Patent [19]

Shin

[11] 4,009,153

[45] Feb. 22, 1977

[54] VAPOR-PHASE PREPARATION OF AROMATIC POLYAMIDES

[75] Inventor: Hyunkook Shin, Wilmington, Del.

[73] Assignee: E. I. Du Pont de Nemours and Co., Wilmington, Del.

[22] Filed: Mar. 4, 1975

[21] Appl. No.: 555,244

[52] U.S. Cl. .............................. 260/78 R; 428/474
[51] Int. Cl.² ........................................ C08G 69/32
[58] Field of Search ................................. 260/78 R

[56] References Cited

UNITED STATES PATENTS

| | | | |
|---|---|---|---|
| 3,679,636 | 7/1972 | Vogelfanger | 260/78 R |
| 3,738,964 | 6/1973 | Dobinson et al. | 260/78 R |
| 3,804,791 | 4/1974 | Morgan | 260/78 R |
| 3,817,941 | 6/1974 | Bair et al. | 260/78 R |
| 3,819,587 | 6/1974 | Kwolek | 260/78 R |
| 3,850,888 | 11/1974 | Fitzgerald et al. | 260/78 R |
| 3,869,429 | 3/1975 | Blades | 260/78 R |
| 3,869,430 | 3/1975 | Blades | 260/78 R |
| 3,884,881 | 5/1975 | Bice et al. | 260/78 R |

*Primary Examiner*—Harold D. Anderson

[57] ABSTRACT

Vapor-phase condensation polymerization of aromatic polyamides is carried out by vaporizing polyamide-forming monomers, diluting with an inert gas, and reacting the monomers in a reaction zone heated in the range of about 150° C. to about 500° C. from about 0.01 second to about 5 seconds or longer. The polyamide is preferably deposited on a removable inorganic or organic substrate maintained within the zone.

8 Claims, 2 Drawing Figures

VAPOR-PHASE PREPARATION OF AROMATIC POLYAMIDES

BACKGROUND OF THE INVENTION

This invention relates to condensation polymerization and, more particularly, relates to condensation polymerization in the vapor phase of aromatic polyamides.

The formation of aromatic condensation polymers is well known in the art. For example, Hill et al., U.S. Pat. No. 3,006,899, and Kwolek et al., U.S. Pat. No. 3,063,966, disclose the preparation of a wholly aromatic high molecular weight polyamide by reacting an aromatic diamine with an aromatic diacid halide in a solvent with an acid acceptor present. The polymers have an exceptionally high melting point and are useful for many purposes, including films and fibers.

Lindlof, U.S. Pat. No. 3,607,365, discloses a vapor-phase technique for the preparation of polyurethanes and polyureas by the reaction of isocyanates with alcohols or amines. Neither reaction liberates any reaction by-product. Lindlof's method involves alternately exposing a substrate to vapors of the isocyanate and then the amine or alcohol until a polymeric coating is built up. Lindlof stresses that his reaction takes place on the substrate surface by first one compound being adsorbed or reacted thereon and then the next compound reacting with the ends of the molecules of the first compound which are oriented perpendicularly to the substrate surface.

Various articles have appeared in the Russian journal "High Molecular Weight Compounds" about polycondensation reactions to form polyamides. An article by Sokolov et al. in 1961 describes preparation of linear polyamides by the reaction of diamines with diacid chlorides in a "gas-phase" synthesis, described as more particularly a liquid-gas interface reaction. In an article by Sokolov in 1964, the foregoing method was described as having produced polyamides such as those from p-phenylene diamine and oxalyl chloride (a partially aromatic polyamide). In 1965, Bagramyants et al. reported gas-gas polycondensation reactions of aminoethanoic acid with hexamethylene-diamine adipate.

SUMMARY OF THE INVENTION

It has been found in accordance with this invention that a vapor-phase condensation polymerization of aromatic polyamides can be carried out by vaporizing the polyamideforming monomers, diluting with an inert diluent gas, and reacting said mixed monomers in a reaction zone heated in the range of about 150° C. to about 500° C. for about 0.01 second to 5 seconds or longer and collecting the aromatic polyamide. Preferably, the aromatic polyamide is deposited on a removable inorganic or organic substrate maintained within the reaction zone. High-tenacity yarns useful for tire cords can be spun from PPD-T polymerized in this manner. Aromatic polyamide films can be produced in accordance with this invention that exhibit outstanding resistance to gas permeation and moisture.

DETAILED DESCRIPTION OF THE INVENTION

Figure 1:
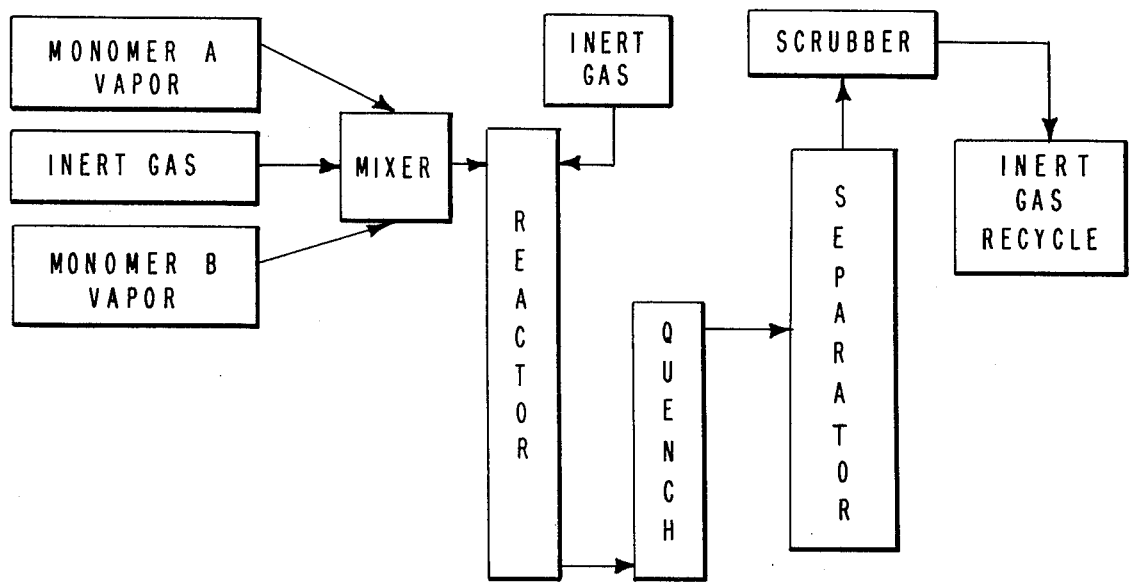
FIG. 1 is a schematic illustration of a flow sheet of one embodiment of the process of this invention.

As depicted in FIG. 1, vapors of two different monomers (A and B) together with hot inert gas are fed to a mixer (such as a jet mixer, a simple short tube or a combination) and then to the reactor inlet. Additional inert gas is optionally applied to the reactor. The reactor effluent stream (consisting of some polymer, possible oligomers and by-products such as HCl) is conducted through a quenching chamber where the stream is cooled by a flow of relatively cold inert gas. Other cooling means including water sprays could be used. The cooled stream is then led through a separator such as a combination of a cyclone separator and filters to remove solid material. The filtered stream is then passed through a water scrubber to remove hydrogen halide and vented to the atmosphere or recycled.

Figure 2:
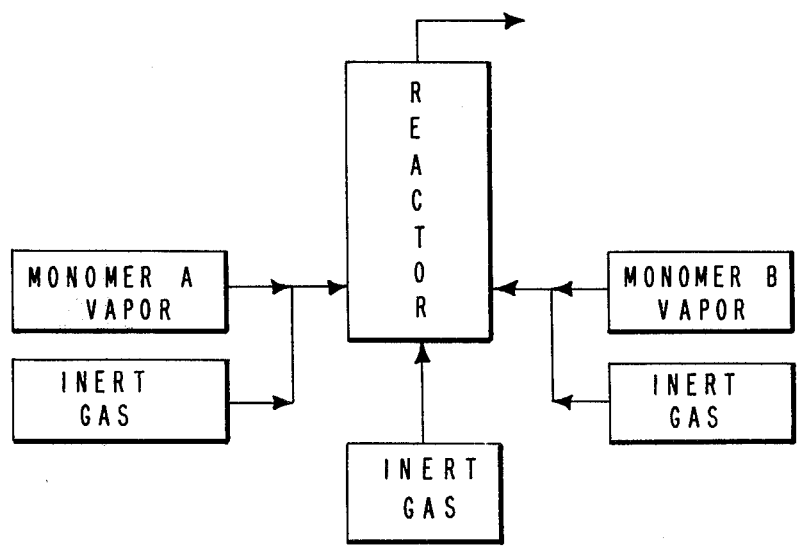
FIG. 2 is a schematic illustration of an alternative flow sheet to and from the reactor in a modification of the process illustrated in FIG. 1.

FIG. 2 depicts the entrance of separate streams of two monomer vapors diluted with inert gas into a reactor. A separate stream of inert gas is also fed to the reactor.

Aromatic polyamides can be prepared from "polyamideforming monomers." By that term is meant the pairs of monomers that form alternating units (e.g., units in the polymer corresponding to diamines and diacids) into high polymers where the units are joined by amide linkages. Examples are aromatic diamines with derivatives of aromatic diacids which will react with these diamines, such as aromatic diacid halides. Representative monomers are described in Kwolek et al., U.S. Pat. No. 3,063,966, and Hill et al., U.S. Pat. No. 3,006,899, the teachings of which are incorporated herein by reference. Particularly, preferred diamines are paraphenylene diamine (PPD), meta-phenylene diamine (MPD), and mixtures thereof. Particularly preferred diacid halides are terephthaloyl chloride TCl), isophthaloyl chloride TCl), and mixtures thereof. Especially preferred polymers are the condensation products of PPD with TCl and MPD with TCl or TCl.

By the term "inert diluent gas" is meant any gas which will serve as a carrier for the monomer and which will not react or inhibit the reaction of the monomer. Representative gases are nitrogen, argon, helium, carbon dioxide, and sulfur dioxide. Nitrogen is preferred.

The monomers can be vaporized by feeding them as melts into heated tubes maintained at temperatures above the monomer vaporization temperature. The streams of monomer vapors can be diluted with a heated inert gas and introduced into a reaction zone where they may optionally be mixed with additional inert gas. The two diluted monomer streams may enter the reactor as separate streams as shown in FIG. 2, or the two streams of monomer vapor may be mixed together with an inert gas in a mixer before entering the reactor proper as shown in FIG. 1. Although only two monomers are shown (e.g., a diamine and a diacid halide), multiple sources of monomer vapors may be used or vapors of mixed monomers in order to make copolyamides. Any unreacted monomers, by-products (e.g., HCl) and some polymer is carried from the reactor zone to an optional quench zone where the stream is cooled by a jet of cold inert gas and thence to a separator (e.g., a cyclone separator with a filter) and to scrubbers to clean the inert gas as shown in FIG. 1. The inert gas may be recycled.

A jet mixer wherein separate jets of monomers and inert gas converge to a common point in a tube is a useful mixer. The mixer is generally heated so that the polymerization may start in this area. The residence time of the gas and vapor in the mixer may range from 0.002 to 0.08 second.

One embodiment of the reactor, termed a "space reactor" (see Examples 6 and 7), produces a stream of fluffy polymer particles. The polymerization presumably occurs in space and not on the reactor walls. This reactor generally has one reaction zone operated at a moderately high temperature (e.g., 250° to 500° C.) followed by a second reaction zone at a lower temperature. The majority of the polymer obtained has a residence time in the first reaction zone about equal to the gas residence time. This is preferably less than 5 seconds and more preferably less than 1 second.

Another embodiment of the reactor, termed a "substrate reactor" (described in Examples 1–5), is capable of making higher molecular weight polymer than the space reactor and produces the primary polymer as a coherent coating of polymer on the surface of the substrate contained in the reactor. This coating is preferably at least 1 mil thick. The substrate can be the walls of the reactor itself, a removable sheet or lining, or particles present. In addition to the primary polymer, some particulate polymer will be collected downstream of the substrate. The residence time in the reactor of the primary polymer is in the range of 1 to 60 minutes or longer.

Preferably, the substrate reactor contains a bed of particles (that may be fluidized or a moving bed) such as preformed polymer itself or inorganic particles such as glass beads, powdered nickel, sand, coarse sodium chloride, etc. The particles should have a softening point above the reaction temperature and have sufficient integrity to retain their bulk size with movement. Preferably, the inorganic particles are inert to the polymerization and to the by-products. Particle sizes of from about 10 to 60 mesh are suitable for sodium chloride with higher inherent viscosity polymer being obtained from the coarser particles. The use of water-soluble particles is advantageous in the recovery of the polymer since they can be dissolved away from the polymer to effect a simple and complete separation.

The reactor should be constructed of material resistant to the monomers and polymerization by-products. Glass, stainless steel, nickel and the like are suitable.

The flow rates of the monomer vapors and inert gas are adjusted to give a total residence time of the gases in the reaction zone of from about 0.01 to about 5 seconds or longer. When using reaction temperatures above about 325° C., the gas residence time should be restricted to less than about 1.5 seconds in order to avoid an excessive amount of branching in the polymer and the residence time of the polymer in the reactor should be restricted, preferably to 30 minutes or less.

The total concentration of the monomers in the reaction zone is not particularly critical and can range from about 2 to 50 mole percent, the remainder being inert gas. Since the rate of conversion appears to be proportional to the square of the monomer concentration, higher concentration will give more polymer in a given time. Although useful polymer can be made at high concentrations in a space reactor, it is more difficult to control the reaction temperature in a substrate reactor due to the heat of polymerization at high concentrations and a maximum of 10 mole percent is preferred for this case.

The molar ratio of reactants is not critical and balance may differ by over 25%, however, equimolar (i.e., stoichiometric) balance is preferred in practice.

The temperature within the reaction zone can range from about 150° C. to 500° C. Preferably, the lower limit is raised to about 250° C. in order to increase the rate of polymerization and the upper limit (particularly in the case of the substrate reactor) is limited to about 400° C. to avoid the excess formation of branched polymer. The formation of branches accelerates with increasing temperatures above about 325° C. with PPD and TCl.

The most preferred process to make fiber-quality polymer uses a monomer concentration of between about 3 and 7 mole percent at a reaction temperature of between 250° and 380° C. in a reactor containing a bed of particles.

The polymer is recovered by mechanically removing from the reactor walls, reactor liners or subsequent stages in the process, grinding to about 60 mesh and then extracting with a solvent for the monomers (e.g., methanol) containing a small amount of HCl, extracting with water and then drying. Polymer deposited on particles is recovered by grinding the polymer-coated particles to a convenient size and then extracting the substrate particles (e.g., with water for NaCl or $Na_2SO_4$) to leave crude polymer or by dissolving the polymer from the substrate (e.g., with concentrated sulfuric acid) and precipitating the solution to give a crude polymer. The crude polymers can be purified as above.

PPD-T polymers prepared by this process with an inherent viscosity of from 0.5 to 6 with almost any branching value (B) are useful for preparing films by casting from a solution. Polymers with an inherent viscosity of from about 2 or 5 with a B value of less than 3.5 (preferably a B value of less then 2.5) are useful to make fibers by spinning from a solution. Polymers with inherent viscosities up to about 6 and higher with B values as high as 6 can be sintered by hot pressing into molded objects such as bearings.

Test Procedures

Inherent Viscosity (I.V.) is defined by the equation:

$$I.V. = \ln(\eta rel)/c$$

where $c$ is the concentration (0.5 gram of polymer in 100 ml. of solvent) of the polymer solution and $\eta rel$ (relative viscosity) is the ratio between the flow times of the polymer solution and the solvent (concentrated sulfuric acid of 95–98% $H_2SO_4$) as measured at 30° C. in a capillary viscometer. Inherent viscosities determined on crude polymer are designated "I.V.$i$" and are generally lower by 0.1 I.V. unit than the I.V. on the purified polymer although occasional samples will have an I.V.$i$ value as much as 1 unit lower.

Branching value (B) is defined as $\eta_B/\eta_{BO}$ where $\eta_B$ is the bulk viscosity at 60° C. of a 2–4.5 weight percent solution of a sample polymer in 100% sulfuric acid and $\eta_{BO}$ is the bulk viscosity at 60° C. of a solution of a control polymer in 100% sulfuric acid at the same concentration as used for the sample polymer. The control polymer of the same I.V. as the sample polymer is prepared in a solvent at low temperatures (cf. U.S. Pat. No. 3,063,966) which affords no branching. The concentrations of the solutions are selected to give convenient measurements with the Brookfield Viscometer (Model HBT) used as follows: I.V. <2.5, 4.53%, I.V.

2.5–5.0, 4.75%, I.V. 5.1–6, 3.07% and I.V. above 6.0, 2.01%.

Tenacity (Ten), elongation (E) and initial modulus (Mi) are obtained from breaking a single filament (gage length of 1.0 inch) or a multifilament yarn having 3 turns per inch twist (gage length 10 inches) on an Instron tester at a rate of extension of 10%/minute.

Gas flows are expressed in the examples as "SCFM" (standard cubic feet per minute) and "SLM" (standard liters per minute), both referring to volumes at 0° C. and 1 atmosphere of pressure.

All gases and vapors are at atmospheric pressure in the examples.

Monomer flow rates are expressed as gram-moles/minute (moles/min.).

The gas residence time in the reactor is calculated assuming that the entire volume of monomer vapors and inert gas pass through the reactor at the average temperature of the reaction.

EXAMPLE 1

Para-phenylene diamine (PPD) vapor and terephthaloyl chloride (TCl) vapor both at 325° C. and at flow rates of 0.359 and 0.357 moles/min., respectively, are mixed with 2.5 SCFM (70.8 SLM) of $N_2$ gas at 400° C. in a mixing jet heated at 470° C. by electrical heaters. The reaction mixture is conducted through a pipe 7 inches long of 0.375 inch I.D., heated to 450° C. by a heating tape, to the reactor. The reactor consists of 24.5-inch-long nickel pipe of 2-inch I.D. in a vertical position containing a removable inside lining of nickel foil, 2 openings on opposite sides of the top of the pipe wall for the reaction mixture entrance and additional $N_2$ gas [2.1 SCFM (59.5 SLM)] at 315° C., a top closure containing a lead to the thermocouple in the reactor, a bottom removable plug and an exit in the lower end of the wall of the pipe. The exterior of the reactor wall is held at 290° C. by heating tapes. The flow rates give a gas residence time in the reactor of about 0.22 second. The reactor exit connects to a vertical quenching tube where 11.7 SCFM (331 SLM) of room temperature $N_2$ gas are added. The quench tube contains a reamer downstream of the quench gas entrance and means for removing deposited polymer powder from the wall of the quench tube. The quench tube is connected with a cyclone separator and a bag filter (where polymer powder is removed) and then through a water scrubber (to remove HCl vapors) to the atmosphere.

Before the run is started, the equipment is preheated to near operating conditions by passing the heated nitrogen streams at their required flow rates and temperatures through the reactor and mixing jet. At the start of each run, both monomer vapor streams (which have previously been established, but not allowed into the mixing jet) are introduced simultaneously into the mixing jet.

The temperature of the reacting mixture (containing 11 mole percent of the two monomers) is found to vary from 350°–370° C. at the reactor inlet, and from 320° to 370° C. at the reactor outlet.

After 5 minutes of operating time, the monomer flows are terminated, the plug at the bottom of the reactor is removed followed by the nickel foil liner and the solid polymer deposited thereon. The nickel foil liner and attached polymer is allowed to cool to room temperature in air. The polymer (approximately 30 grams) is then peeled from the nickel foil and ground in a Wiley Mill until it passes through a 60-mesh screen.

The polymer is washed 3 times in a blender, with methanol which contains 3.0% HCl, to remove any unreacted monomer. The polymer is then washed 2 times with methanol and then several times with distilled water until the pH of wash water is above 6.5. The polymer is dried in a vacuum oven. The I.V. of the extracted polymer is 4.3 with a B value of 2.1. This polymer is spun into filaments using the technique of U.S. Pat. No. 3,767,756 to give a yarn with ten. of 18 grams/denier (gpd), E of 3.3% and Mi of 500 gpd for the 600 denier yarn.

Additional polymer (about 550 g.) is recovered from the spaces between the reactor and the scrubber. This polymer typically has an I.V. of between 0.6 and 1.6.

EXAMPLE 2

A.

The general procedure of Example 1 is followed using a feed of 0.373 moles/min. of PPD, 0.369 moles/min. of TCl and 9.66 moles/min. [7.64 SCFM (216.3 SLM)] of nitrogen to the mixing jet heated to 200° C. The reaction mixture (7.1 mole percent monomers) is conducted through the pipe to the reactor (27-inch length) for a gas residence time of 0.166 second. No nitrogen is added at the reactor. The temperature ranges of the reacting mixture at the top and bottom of the reactor are 220°–252° C. and 208°–252° C., respectively. A range of 97°–136° C. is observed in the cyclone separator.

A ten-minute run yields polymer as follows: 90 g. Ni liner, 44 g. quench tube and 536 g. separator (I.V.i 0.63 and I.V. 1.6).

Purification of the polymer from the liner yields about 85 g. of polymer of I.V. 3.1 and a B value of 1.11. The polymer is mixed with about 100% $H_2SO_4$ to about 20% solids and spun using the technique of U.S. Pat. No. 3,767,756 to give filaments of 2 denier/filament of ten. 24 gpd, E 3.6% and Mi of 770 gpd.

B.

The general procedure of A above is followed using 0.348 and 0.347 moles/min. of PPD and TCl vapors mixed with $N_2$ to give a 16.4 mole percent of monomers fed to the reactor for a gas residence time of 0.308 second. The temperatures are adjusted to give temperatures at the top and bottom of the reactor of 255°–310° C. and 272°–420° C., respectively.

A 3-minute run yields 26 grams of polymer from the Ni liner with an I.V. of 3.6 and a B value of 2.4 and an estimated 550 g. (typically I.V. 0.6–1.6) from the rest of the system.

C.

The procedure of A is followed using 19.7 mole percent of monomers in $N_2$ to the reactor with a gas residence time of 0.249 second. Temperatures are adjusted to give reaction temperatures of the reactor of 440° to 470° C. A 1-minute run yields 4 grams of polymer of I.V. of 6.0 and a B value of 1.8 from the liner.

EXAMPLE 3

This example illustrates the use of a fluidized bed reactor. The vertical reactor is a 4-foot-long tube of 6-inch I.D. with a gas distribution plate (5X Dynalloy porous metal sheet) supported by perforated stainless steel plates on the bottom and connected at the reactor top to a quenching tube, a cyclone separator, filter and a water scrubber.

A.

TCl vapor (0.245 moles/min.) at about 305° C. is mixed with 2.5 SCFM (70.9 SLM) of $N_2$ at 215° C. PPD vapor (0.246 moles/min.) at about 290° C. is mixed with 2.3 SCFM (65.1 SLM) of $N_2$ at about 220° C. Both diluted monomer streams are cooled to about 220° C. and mixed in a jet held at about 390° C. and fed into the reactor just above the distributor plate. The reactor contains about 12 pounds of extra coarse NaCl (about 10-mesh) and is partially fluidized by 4.0 SCFM (113 SLM) of $N_2$ at about 220° C. that is fed into the reactor through the distribution plate. The reaction mixture contains 4.35 mole percent of monomers. The gas residence time in the fluidized bed is 1.2 seconds.

The fluidized bed is preheated to operating temperature by passing heated nitrogen streams without monomer through the reactor. When the fluidized bed reaches 310° C., both monomer vapor streams (which have previously been established but not allowed to flow into the reactor) are introduced simultaneously into their respective $N_2$ flows. The side walls of the reactor are maintained at 210° C. by means of electrical heating tapes, and are insulated against excessive heat loss by several layers of "Fiberfrax" ceramic batting. The temperature in the fluidized bed remained constant at 310° C. After passing through the reactor, the reaction mix is quenched by addition of 8.0 SCFM (227 SLM) of room temperature nitrogen. The quenched mixture is passed into a combined cyclone separator and bag filter, then through a water scrubber and the cleaned gas exhausted to the atmosphere. After 30 minutes of operating time, the monomer flows are stopped, all heaters turned off, and the reactor and bed cooled by flowing nitrogen. The cooled bed of polymer-coated NaCl particles is removed and ground into fine powder in a ball mill. The polymer is washed in a blender 3 times with water to remove most of the NaCl. To remove any unreacted monomers and the remainder of the NaCl, the polymer is washed 3 times with methanol which contains 3% HCl, 3 times in methanol and then several times in distilled water until the wash water shows only a slight precipitate upon addition of $AgNO_3$. The polymer is then dried in a vacuum oven at about 70° C. and 15 inches Hg vacuum. The resulting polymer (an estimated 1835 g.) has I.V. of 3.8 and a B value of 2.0. Yarns (720 denier) of 2 dpf filaments with ten. 19 gpd, E 3.3% and Mi 625 gpd are prepared.

An additional 455 g. of polymer with an I.V. typically ranging from 1.5 to 2.5 is recovered from the rest of the system.

B. The above procedure is repeated in a 36-inch-long reactor of 3-inch I.D. using 12 mole percent of PPD and TCl in $N_2$ at a reaction temperature of 260° C. and at a gas residence time of 0.67 seconds for 30 minutes to yield polymer from the salt particles with an I.V. of 2.2 and a B value of 1.7. Each monomer (and $N_2$) enters the reactor just above the distribution plate on opposite walls of the reactor.

EXAMPLE 4

This example shows the preparation of other polyamides and a copolyamide.

The general procedure of Example 1 is followed except that separate streams of the diamine/$N_2$ and acid chloride/$N_2$ are fed from opposite sides of a tubing cross on the end of the horizontally positioned reactor consisting of a 6.5-inch-long, 1-inch I.D. stainless steel tubing containing a liner of 2-mil-thick nickel foil which is connected to a vertical quench tube with cold nitrogen and leads to a cyclone separator and gas scrubber. The reactor is heated externally. Essentially stoichiometric ratios of the two monomers are used.

A.

A mixture of diamine (97 mole percent PPD, 3 mole percent MPD), TCl and $N_2$ with a total monomer concentration of 6.0 mole percent are reacted at 355° C. at a gas residence time of 0.108 second for a total of 15 minutes. The polymer (4.5 g.) taken from the foil has an I.V. of 3.8 and a B value of 2.4. An additional 54 g. of polymer is recovered beyond the reactor.

B.

MPD and TCl diluted with $N_2$ (6.3 mole percent monomers) are polymerized at 350° C. with a gas residence time of 0.116 second for 15 minutes. The polymer (4.9 g.) recovered from the foil has an I.V. of 0.62. Fibers can be prepared from this polymer. An additional 63 g. of polymer is recovered beyond the reactor.

C.

MPD and TCl diluted with $N_2$ (5.3 mole percent monomers) are polymerized at 350° C. with a gas residence time of 0.165 second for 10 minutes. The polymer (2.7 g.) recovered from the foil has an I.V. of 0.90. Fibers can be prepared from this polymer. An additional 42 g. of polymer is recovered in the sections beyond the reactor.

EXAMPLE 5

This example shows the influence of gas residence time on the polymer using the general procedure of Example 4.

A.

PPD, TCl and $N_2$ (5.9 mole percent monomers) are reacted at 308° C. at a gas residence time of 0.18 second for 14 minutes to yield 4.7 g. polymer from the foil with an I.V. of 3.0 and a B value of 1.3.

B.

The same monomers as above are reacted at 300° C. at a much longer gas residence time of 2.0 seconds for 20 minutes to yield polymer from the foil with an I.V. of 3.0 and an average B value of 3.5.

EXAMPLE 6

This example shows the use of a space reactor. PPD and TCl monomer vapor streams diluted with $N_2$ are mixed with additional $N_2$ [0.45 SCFM (12.7 SLM)] at 390° C. in a mixing jet (heated to 295° C.) connected with a 9.1-inch length of 0.5-inch I.D. tubing (the first 6.1 inches is heated to about 280° C.). From the tubing, the reaction mixture flows into an unheated cyclone separator and the gases carried to a scrubber. The PPD stream consists of 0.440 moles/min of monomer at about 350° C. and 0.225 SCFM (6.4 SLM) of $N_2$ at 390° C. The TCl stream consists of 0.443 moles/min. of monomer at 320° C. with 0.225 SCFM (6.4 SLM) of $N_2$ at 390° C. The polymerization (44 mole percent monomers) is run at a gas residence time of 0.02 second (in the tube) for 4 minutes. It is believed that the separator serves as a second reaction zone under these conditions. A total of 61.8 g. of a loose, fluffy polymer is collected from the cyclone having an I.V. of from 2.4–2.9. An additional 2.6 g. of polymer is recovered from the tube. Fibers with a filament ten. of 13, E of 3% and Mi of 560 are prepared from the polymer taken from the cyclone after purification.

EXAMPLE 7

This example shows the use of a porous wall reactor (to reduce polymer coating on the reactor wall) as the first reaction zone of a space reactor. PPD and TCl monomer vapor streams (each at 0.32 mole/min. are mixed with $N_2$ in a mixing jet (heated to 430° C.) and conducted to a first reactor which is connected to a 2-inch I.D. quench tube (where room temperature $N_2$ is admitted) which leads to an unheated cyclone separator and a gas scrubber. The first reactor is a 3-foot length of 2.125-inch I.D. porous wall tube (made by sintering powdered stainless steel) enclosed in a heated tube. $N_2$ at about 350° C. flows through the heated tube into the annulus and through the walls of the reactor. The reaction mixture (4.4 mole percent monomers) has a gas residence time in the reactor of 0.12 second (based on a temperature of 360° C.). The polymerization is run for about 10 minutes. The temperature ranges from 330°–360° C. near the exit of the first reactor and from 159°–230° C. in the cyclone separator. The major part of the polymer is recovered from the cyclone separator (195 g. with an I.V. of 2.4 and B value of 1.8) and from the filter bags above the cyclone (449 g. with an I.V. of 1.4 and a B value of 1.4). A minor amount of polymer is recovered from the quench tube (123 g. with an $I.V._i$ of 2.6–3.1) and from the first reactor (52 g. with an $I.V._i$ of 5.3).

I claim:

1. A process for the preparation of film-forming aromatic polyamides by direct vapor phase condensation of one or more aromatic diamines and one or more aromatic diacid halides which comprises vaporizing the diamine(s) and diacid halide(s), mixing the vaporized diamine and diacid halide in the presence of an inert diluent gas and reacting the mixture in a reaction zone at a temperature between about 150° C and 500° C for at least 0.01 second, and collecting the aromatic polyamide.

2. The process as defined in claim 1 wherein said temperature is between about 250° C and 400° C, the gas residence time in said zone is less than about 5 seconds, and the total concentration of diamine and diacid halide in said zone is between about 2 to 50 mole percent.

3. The process as defined in claim 1 wherein said temperature is above about 325° C. and the gas residence time in said zone is less than about 1.5 seconds.

4. The process as defined in claim 2 wherein the concentration of diamine and diacid halide in said zone is between about 2 and 10 mole percent and said reaction zone contains inert substrate particles having a softening point above said reaction temperature.

5. The process defined in claim 1 wherein the diacid halide is a diacid chloride.

6. The process as defined in claim 5 wherein said aromatic diamine is p-phenylene diamine and said aromatic diacid halide is terephthaloyl chloride.

7. The process defined in claim 5 wherein said aromatic diamine is m-phenylene diamine and said aromatic diacid halide is terephthaloyl chloride.

8. The process as defined in claim 5 wherein said aromatic diamine is m-phenylene diamine and said aromatic diacid halide is isophthaloyl chloride.

* * * * *